(12) United States Patent
Dent (10) Patent No.: US 9,176,940 B2
(45) Date of Patent: Nov. 3, 2015

(54) SYSTEM AND METHOD FOR TEXT EDITOR TEXT ALIGNMENT CONTROL

(71) Applicant: Research In Motion Limited, Waterloo (CA)

(72) Inventor: Terrill Mark Dent, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 315 days.

(21) Appl. No.: 13/837,107

(22) Filed: Mar. 15, 2013

(65) Prior Publication Data

US 2014/0281942 A1 Sep. 18, 2014

(51) Int. Cl.
| | |
|---|---|
| G06F 17/24 | (2006.01) |
| G06F 17/21 | (2006.01) |
| G06F 3/0486 | (2013.01) |
| G06F 3/0488 | (2013.01) |

(52) U.S. Cl.
CPC .............. G06F 17/24 (2013.01); G06F 3/0486 (2013.01); G06F 3/04883 (2013.01); G06F 17/212 (2013.01)

(58) Field of Classification Search
CPC ........ G06F 17/24; G06F 17/211; G06T 11/60
USPC ........................................................ 715/256
See application file for complete search history.

(56) References Cited

U.S. PATENT DOCUMENTS

| | | | |
|---|---|---|---|
| 5,630,080 A | 5/1997 | Malamud et al. | |
| 5,760,773 A * | 6/1998 | Berman et al. | 715/808 |
| 5,778,404 A * | 7/1998 | Capps et al. | 715/234 |
| 6,088,027 A | 7/2000 | Konar et al. | |
| 6,535,615 B1 * | 3/2003 | Zachmann et al. | 382/100 |
| 7,046,848 B1 * | 5/2006 | Olcott | 382/176 |
| 7,254,787 B2 | 8/2007 | Jaeger | |
| 7,703,036 B2 | 4/2010 | Satterfield et al. | |
| 8,185,164 B2 | 5/2012 | Kim | |
| 8,255,830 B2 | 8/2012 | Ording et al. | |
| 9,043,349 B1 * | 5/2015 | Lin et al. | 707/758 |

(Continued)

FOREIGN PATENT DOCUMENTS

| | | |
|---|---|---|
| EP | 2498175 | 9/2012 |
| WO | WO 2006036887 A2 * | 4/2006 |

OTHER PUBLICATIONS

Dummies.com "How to Select Text for Editing on the Samsung Galaxy Tab" Sep. 1, 2012, pp. 1-2 http://www.dummies.com/how-to/content/how-to-select-text-for-editing-on-the-s.*

(Continued)

*Primary Examiner* — Scott Baderman
*Assistant Examiner* — Mario M Velez-Lopez
(74) *Attorney, Agent, or Firm* — Fish & Richardson P.C.

(57) ABSTRACT

A method for an electronic device having an input device and a display, including, displaying a block of text within a text editing application, displaying, in proximity of the block of text, an alignment control interface after a precondition is met, detecting a dragging motion associated with the alignment control interface, modifying an alignment of the block of text based, at least in part, on the detected dragging motion, detecting an end of the dragging motion, and, displaying, in a predetermined position associated with the alignment of the block of text, the alignment control interface. An electronic device including a display, an input device, a memory, and a processor, the processor being configured to execute the method.

20 Claims, 12 Drawing Sheets

(56) References Cited

U.S. PATENT DOCUMENTS

| | | | |
|---|---|---|---|
| 2002/0032018 A1* | 3/2002 | Morton et al. | 455/412 |
| 2002/0032705 A1* | 3/2002 | Higashiyama et al. | 707/530 |
| 2005/0177786 A1* | 8/2005 | Shade et al. | 715/518 |
| 2006/0036946 A1* | 2/2006 | Radtke et al. | 715/711 |
| 2006/0055700 A1* | 3/2006 | Niles et al. | 345/473 |
| 2007/0176922 A1* | 8/2007 | Ikeda et al. | 345/419 |
| 2009/0228792 A1 | 9/2009 | Van Os et al. | |
| 2009/0249239 A1 | 10/2009 | Eilers | |
| 2009/0319879 A1* | 12/2009 | Scott et al. | 715/205 |
| 2011/0055773 A1 | 3/2011 | Agarawala et al. | |
| 2011/0239153 A1* | 9/2011 | Carter et al. | 715/784 |
| 2012/0159318 A1 | 6/2012 | Shaw et al. | |
| 2013/0007606 A1* | 1/2013 | Dolenc | 715/256 |
| 2013/0127703 A1* | 5/2013 | Wendt | 345/156 |

OTHER PUBLICATIONS

Stackoverflow.com, "setTimeout( ) and setting parameters" Mar. 1, 2013, pp. 1-5 http://stackoverflow.com/questions/5169020/set-timeout-and-setting-parameters.*

Extended European Search Report dated Aug. 30, 2013, issued in European Application No. 13159460.8 (6 pages).

* cited by examiner

For McLuhan, it was the medium itself that shaped and controlled "the scale and form of human association and action". Taking the movie as an example, he argued that the way this medium played with conceptions of speed and time, transformed "the world of sequence and connections into the world of creative configuration and structure."

/510

**Therefore *the* message** of the movie medium is this transition from "lineal connections" to "configurations".

Therefore the message of the movie medium is this transition from "lineal connections" to "configurations".

Extending the argument for understanding the medium as the message itself, he proposed that the "content of any medium is always another medium" - thus, the content of writing is speech, print is that of writing and print itself is the content of the telegraph.

McLuhan understood "medium" in a broad sense. He identified the light bulb as a clear demonstration of the concept of "the medium is the message". A light bulb does not have content in the way that a newspaper has articles or a television has programs, yet it is a medium that has a social effect: that is, a light bulb enables people

FIG. 5A

For McLuhan, it was the medium itself that shaped and controlled "the scale and form of human association and action". Taking the movie as an example, he argued that the way this medium played with conceptions of speed and time, transformed "the world of sequence and connections into the world of creative configuration and structure." ⟋520

> Therefore *the message* of the movie medium is this transition from "lineal connections" to "configurations".

Therefore the message of the movie medium is this transition from "lineal connections" to "configurations".

Extending the argument for understanding the medium as the message itself, he proposed that the "content of any medium is always another medium" - thus, the content of writing is speech, print is that of writing and print itself is the content of the telegraph.

McLuhan understood "medium" in a broad sense. He identified the light bulb as a clear demonstration of the concept of "the medium is the message". A light bulb does not have content in the way that a newspaper has articles or a television has programs, yet it is a medium that has a social effect; that is, a light bulb enables people

FIG. 5B

For McLuhan, it was the medium itself that shaped and controlled "the scale and form of human association and action". Taking the movie as an example, he argued that the way this medium played with conceptions of speed and time, transformed "the world of sequence and connections into the world of creative configuration and structure."

Therefore the message of the movie medium is this transition from "lineal connections" to "configurations".

> **Therefore *the message* of the movie medium is this transition from "lineal connections" to "configurations".** ⟵ 530

Extending the argument for understanding the medium as the message itself, he proposed that the "content of any medium is always another medium" - thus, the content of writing is speech, print is that of writing and print itself is the content of the telegraph.

McLuhan understood "medium" in a broad sense. He identified the light bulb as a clear demonstration of the concept of "the medium is the message". A light bulb does not have content in the way that a newspaper has articles or a television has programs, yet it is a medium that has a social effect; that is, a light bulb enables people

FIG. 5C

For McLuhan, it was the medium itself that shaped and controlled "the scale and form of human association and action". Taking the movie as an example, he argued that the way this medium played with conceptions of speed and time, transformed "the world of sequence and connections into the world of creative configuration and structure." ⟋540

> **Therefore *the* message** of the movie medium is this transition from "lineal connections" to "configurations".

Therefore the message of the movie medium is this transition from "lineal connections" to "configurations".

Extending the argument for understanding the medium as the message itself, he proposed that the "content of any medium is always another medium" - thus, the content of writing is speech, print is that of writing and print itself is the content of the telegraph.

McLuhan understood "medium" in a broad sense. He identified the light bulb as a clear demonstration of the concept of "the medium is the message". A light bulb does not have content in the way that a newspaper has articles or a television has programs, yet it is a medium that has a social effect: that is, a light bulb enables people

FIG. 5D

For McLuhan, it was the medium itself that shaped and controlled "the scale and form of human association and action". Taking the movie as an example, he argued that the way this medium played with conceptions of speed and time, transformed "the world of sequence and connections into the world of creative configuration and structure."

/ 550

> **Therefore *the* message** of the movie medium is this transition from "lineal connections" to "configurations".

Therefore the message of the movie medium is this transition from "lineal connections" to "configurations".

Extending the argument for understanding the medium as the message itself, he proposed that the "content of any medium is always another medium" - thus, the content of writing is speech, print is that of writing and print itself is the content of the telegraph.

McLuhan understood "medium" in a broad sense. He identified the light bulb as a clear demonstration of the concept of "the medium is the message". A light bulb does not have content in the way that a newspaper has articles or a television has programs, yet it is a medium that has a social effect: that is, a light bulb enables people

FIG. 5E

The medium is the message

For McLuhan, it was the medium itself that shaped and controlled "the scale and form of human association and action". Taking the movie as an example, he argued that the way this medium played with conceptions of speed and time, transformed "the world of sequence and connections into the world of creative configuration and structure." Therefore the message of the movie medium is this transition from "lineal connections" to "configurations". ⟋610

He proposed that the "content of any medium is always another medium" - thus, the content of writing is speech, print is that of writing and print itself is the content of the telegraph.

> Extending the argument for understanding the medium as the message itself.

McLuhan understood "medium" in a broad sense. He identified the light bulb as a clear demonstration of the concept of "the medium is the message". A light bulb does not have content in the way that a newspaper has articles or a television has programs, yet it is a medium that has a social effect; that is, a light bulb enables people to create spaces during nighttime that would otherwise be enveloped by darkness. He describes the light bulb as a medium without any content. McLuhan states that "a light bulb creates an environment by its mere presence."

FIG. 6A

The medium is the message

For McLuhan, it was the medium itself that shaped and controlled "the scale and form of human association and action". Taking the movie as an example, he argued that the way this medium played with conceptions of speed and time, transformed "the world of sequence and connections into the world of creative configuration and structure." Therefore the message of the movie medium is this transition from "lineal connections" to "configurations". ⟋620

He proposed that the "content of any medium is always another medium" - thus, the content of writing is speech, print is that of writing and print itself is the content of the telegraph.

> Extending the argument for understanding the medium as the message itself.

McLuhan understood "medium" in a broad sense. He identified the light bulb as a clear demonstration of the concept of "the medium is the message". A light bulb does not have content in the way that a newspaper has articles or a television has programs, yet it is a medium that has a social effect; that is, a light bulb enables people to create spaces during nighttime that would otherwise be enveloped by darkness. He describes the light bulb as a medium without any content. McLuhan states that "a light bulb creates an environment by its mere presence."

FIG. 6B

The medium is the message

For McLuhan, it was the medium itself that shaped and controlled "the scale and form of human association and action". Taking the movie as an example, he argued that the way this medium played with conceptions of speed and time, transformed "the world of sequence and connections into the world of creative configuration and structure." Therefore the message of the movie medium is this transition from "lineal connections" to "configurations".

He proposed that the "content of any medium is always another medium" - thus, the content of writing is speech, print is that of writing and print itself is the content of the telegraph.

Extending the argument for understanding the medium as the message itself. /630

McLuhan understood "medium" in a broad sense. He identified the light bulb as a clear demonstration of the concept of "the medium is the message". A light bulb does not have content in the way that a newspaper has articles or a television has programs, yet it is a medium that has a social effect; that is, a light bulb enables people to create spaces during nighttime that would otherwise be enveloped by darkness. He describes the light bulb as a medium without any content. McLuhan states that "a light bulb creates an environment by its mere presence."

FIG. 6C

SYSTEM AND METHOD FOR TEXT EDITOR TEXT ALIGNMENT CONTROL

FIELD

Example embodiments disclosed herein relate generally to text alignment methodologies for electronic devices, such as handheld electronic devices, and more particularly, to systems and methods for modifying the alignment of a block of text based on an alignment control interface.

BACKGROUND

Electronic devices, such as computers, laptops, ultrabooks, netbooks, tablets, cellular phones, smart phones, personal digital assistants, etc., typically allow a user to input characters into a text editing application, such as a word processor, e-mail application, or HTML editor. A text editing application can allow a user to modify the alignment and position of a block of text, such as a sentence, heading, or paragraph. Modifying the alignment or position of text blocks can be a cumbersome task, due to, for example, the position or layout of controls in a text editing application, particularly where a user needs to quickly and efficiently modify the alignment or position of text blocks.

DESCRIPTION OF EXAMPLE EMBODIMENTS

Reference will now be made in detail to various embodiments, examples of which are illustrated in the accompanying drawings. Wherever possible, the same reference numbers will be used throughout the drawings to refer to the same or like parts.

The present disclosure relates to an electronic device. The electronic device can be a mobile or handheld wireless communication device such as a cellular phone, smart phone, wireless organizer, personal digital assistant, wirelessly enabled notebook computer, tablet, or similar device. The electronic device can also be an electronic device without wireless communication capabilities, such as a desktop computer, handheld electronic game device, digital photograph album, digital camera, or other device.

Conventional text editing applications often provide a fixed toolbar in one region of the display that includes an arrangement of several buttons related to text alignment, such as "left alignment," "center alignment," "right alignment," and "justified." In a text editing application, however, it is often preferable to preserve space for writing and avoid using space for objects such as fixed toolbars and buttons. Additionally, it is often desirable to place editing controls in close proximity to the element that they act upon. This may result in less movement and a higher degree of association between action (e.g., selecting an alignment option) and result (e.g., seeing the result of the selection), while permitting the user to modify the alignment or position of text blocks without diverting attention and visual focus from regions of the display in which the text blocks are displayed.

Accordingly, example embodiments described herein permit the user of an electronic device to modify the alignment and position of text blocks through user-selectable control interfaces placed in proximity to the text blocks.

Use of the indefinite article "a" or "an" in the specification and the claims is meant to include one or more than one of the feature that it introduces, unless otherwise indicated. Similarly, use of the definite article "the," particularly after a feature has been introduced with the indefinite article, is meant to include one or more than one of the feature to which it refers (unless otherwise indicated).

In one example embodiment, a method for an electronic device having an input device and a display is provided. The method comprises displaying, in proximity of the block of text, an alignment control interface after a precondition is met, detecting a dragging motion associated with the alignment control interface, modifying an alignment of the block of text based, at least in part, on the detected dragging motion, detecting an end of the dragging motion, and, displaying, in a predetermined position associated with the alignment of the block of text, the alignment control interface.

In another example embodiment, a method for an electronic device having an input device and a display is provided. The method comprises displaying a block of text within a text editing application, displaying, in proximity of the block of text, a float control interface after a precondition is met, detecting a dragging motion associated with the float control interface, modifying a position of the block of text based, at least in part, on the detected dragging motion, detecting an end of the dragging motion, and, displaying, in a predetermined position associated with the position of the block of text, the float control interface.

In another example embodiment, an electronic device is provided. The electronic device comprises a display configured to display characters, an input device, a memory storing one or more instructions, and a processor. The processor is configured to execute the one or more instructions to perform: displaying, in proximity of the block of text, an alignment control interface after a precondition is met, detecting a dragging motion associated with the alignment control interface, modifying an alignment of the block of text based, at least in part, on the detected dragging motion, detecting an end of the dragging motion, and, displaying, in a predetermined position associated with the alignment of the block of text, the alignment control interface.

In another example embodiment, an electronic device is provided. The electronic device comprises a display configured to display characters, an input device, a memory storing one or more instructions, and a processor. The processor is configured to execute the one or more instructions to perform: displaying a block of text within a text editing application, displaying, in proximity of the block of text, a float control interface after a precondition is met, detecting a dragging motion associated with the float control interface, modifying a position of the block of text based, at least in part, on the detected dragging motion, detecting an end of the dragging motion, and, displaying, in a predetermined position associated with the position of the block of text, the float control interface.

These example embodiments, in addition to those described below, permit, for example, the user of an electronic device to modify the alignment and position of text blocks through the use of control interfaces placed in proximity to the text blocks, without diverting attention and visual focus from the regions of the display in which the text blocks are positioned. This may result in less movement and a higher degree of association between the user's action and the result, while allowing the user's focus to remain on the regions of the display in which the text blocks are positioned, enhancing efficiency, accuracy, and speed of character input and text block modification.

Figure 1:
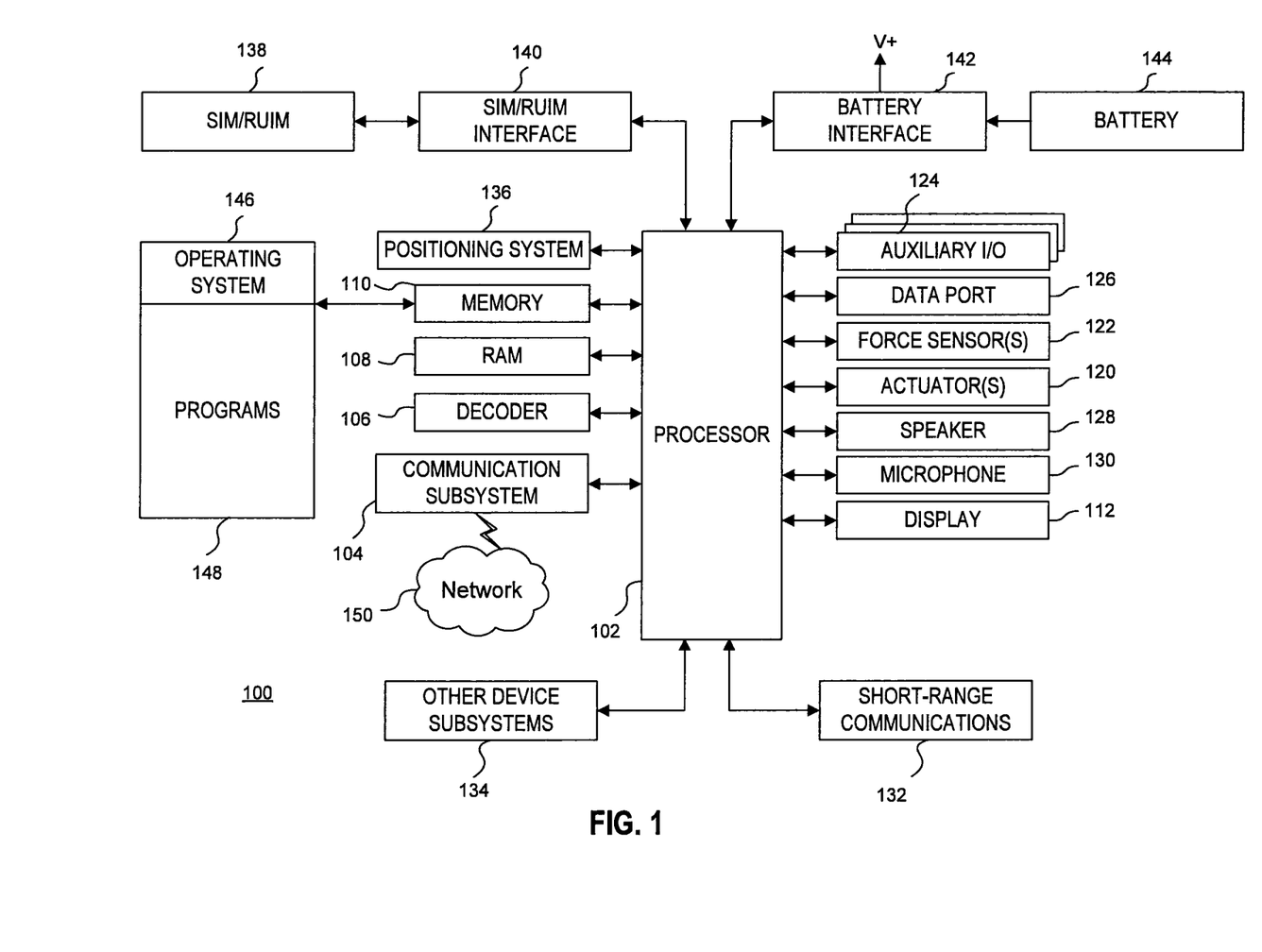
FIG. 1 is an example block diagram illustrating an electronic device, consistent with embodiments disclosed herein.

FIG. 1 is an example block diagram of an electronic device 100, consistent with example embodiments disclosed herein. Electronic device 100 includes multiple components, such as a processor 102 that controls the overall operation of electronic device 100. Communication functions, including data and voice communications, are performed through a communication subsystem 104. Data received by electronic device 100 is decompressed and decrypted by a decoder 106. The communication subsystem 104 receives messages from and sends messages to a network 150. Network 150 can be any type of network, including, but not limited to, a wired network, a data wireless network, voice wireless network, and dual-mode wireless networks that support both voice and data communications over the same physical base stations. Electronic device 100 can be a battery-powered device and include a battery interface 142 for receiving one or more batteries 144. In some embodiments, electronic device 100 can be a computer, laptop, ultrabook, netbook, or table device, or another device, and such an electronic device can include all or a subset of the components illustrated in FIG. 1. The choice of components included in electronic device 100 is not critical to any embodiment.

Processor 102 is coupled to and can interact with additional subsystems such as a Random Access Memory (RAM) 108; a memory 110, such as a hard drive, CD, DVD, flash memory, or a similar storage device; one or more displays 112; one or more actuators 120; one or more force sensors 122; an auxiliary input/output (I/O) subsystem 124; a data port 126; one or more speakers 128; one or more microphones 130; short-range communications 132; and other device subsystems 134.

Display 112 is coupled to and controlled by processor 102. Characters, such as text, symbols, images, and other items are displayed on display 112 via processor 102. Characters can be input into the electronic device 100 using a keyboard (not pictured in FIG. 1), such as a physical keyboard having keys that are mechanically actuated, or a virtual keyboard having keys rendered on display 112.

Processor 102 can also interact with a positioning system 136 for determining the location of electronic device 100. The location can be determined in any number of ways, such as by a computer, by a Global Positioning System (GPS) (which can be included in electronic device 100), through a Wi-Fi network, or by having a location entered manually. The location can also be determined based on calendar entries.

In some embodiments, to identify a subscriber for network access, electronic device 100 uses a Subscriber Identity Module or a Removable User Identity Module (SIM/RUIM) card 138 inserted into a SIM/RUIM interface 140 for communication with a network, such as network 150. Alternatively, user identification information can be programmed into memory 110.

Electronic device 100 also includes an operating system 146 and programs 148 that are executed by processor 102 and are typically stored in memory 110 or RAM 108. Additional applications can be loaded onto electronic device 100 through network 150, auxiliary I/O subsystem 124, data port 126, short-range communications subsystem 132, or any other suitable subsystem.

A received signal such as a text message, an e-mail message, or a web page download is processed by communication subsystem 104. This processed information is then provided to processor 102. Processor 102 processes the received signal for output to display 112, to auxiliary I/O subsystem 124, or a combination of both. A user can compose data items, for example e-mail messages, which can be transmitted over network 150 through communication subsystem 104. For voice communications, the overall operation of electronic device 100 is similar. Speaker 128 outputs audible information converted from electrical signals, and microphone 130 converts audible information into electrical signals for processing.

Figure 2:
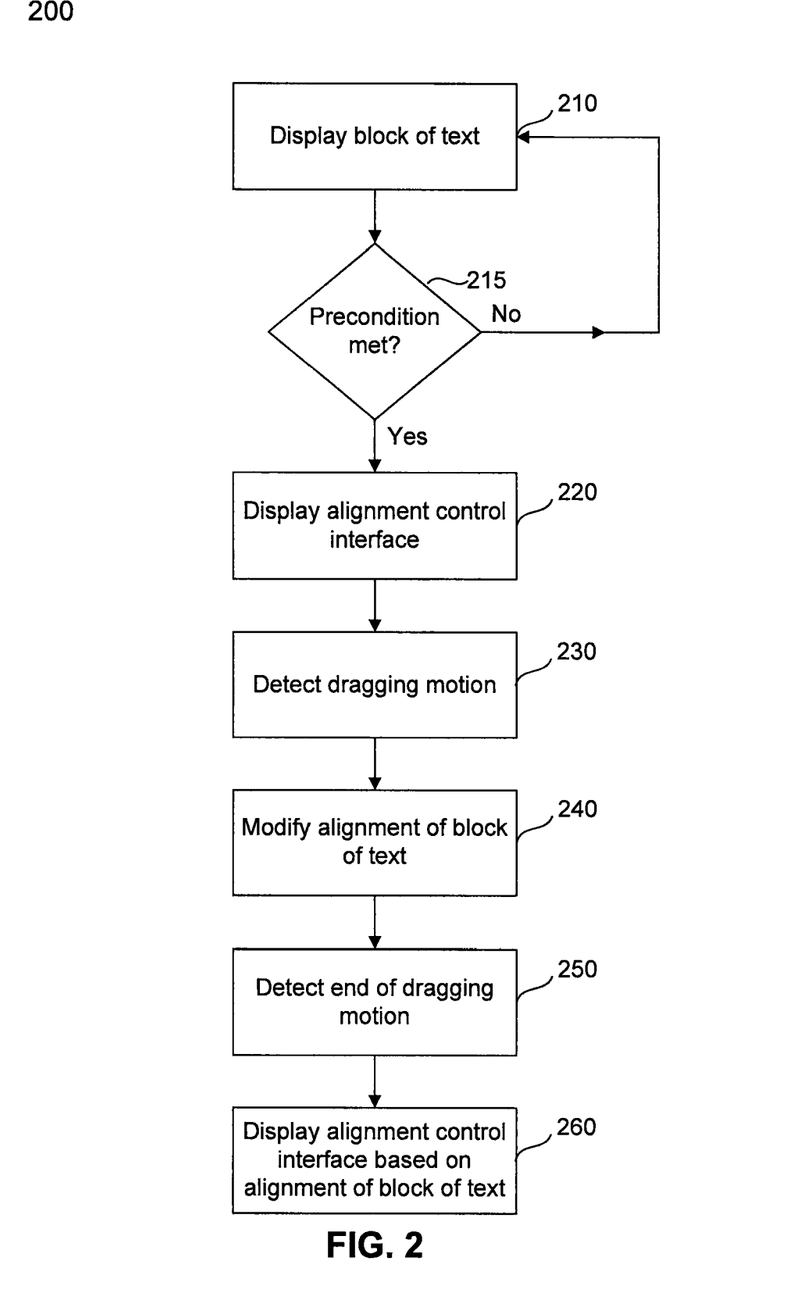
FIG. 2 is a flowchart illustrating an example method for modifying the alignment of a block of text based on an alignment control interface, consistent with embodiments disclosed herein.

FIG. 2 is an example flowchart illustrating an example method 200 for modifying the alignment of a block of text based on an alignment control interface, consistent with example embodiments disclosed herein. Memory (such as memory 108 or RAM 110) can include a set of instructions that, when executed by a processor (such as processor 102), can be used to modify the alignment of a block of text based on an alignment control interface.

Referring back to FIG. 2, method 200 begins at step 210, where the processor 102 displays a block of text within a text editing application. In some embodiments, the processor 102 receives an input reflecting placement of a caret in, or near, a block of text within a text editing application. A caret refers to a cursor (e.g., a blinking cursor) or other symbol indicating a position for inserting or removing text. A block of text refers to a character, word, sentence, heading, paragraph, or other unit or units of text. At step 215, the processor 102 checks whether a precondition is met. For example, the processor 102 may check whether, during a specified time period, an input is received reflecting placement of a caret in, or near, a block of text, an input is received changing placement of the caret, a character input is received, and/or an input is detected reflecting selection of an application outside of the text editing application. A text editing application can include, for example, a word processor, an e-mail application, or a HTML editor. In some embodiments, the processor 102 determines that the precondition is met unless any of the above-described instances occur. The specified time period can vary in duration; exemplary durations include 300 milliseconds and 500 milliseconds. One advantage of implementing such a precondition includes avoidance of a "flicker" effect, in which a component of a user interface is shown and hidden repeatedly, which can have the effect of cluttering the display and/or distracting a user. Returning back to FIG. 2, if at step 215 the processor 102 determines that the precondition is not met, the method returns to step 210. Otherwise, the processor 102 continues on to step 220.

At step 220, the processor 102 displays an alignment control interface in proximity to the block of text. The alignment control interface can be a user-selectable visual element. In some embodiments, the alignment control interface visually indicates the present alignment of the block of text by, for instance, displaying horizontal lines corresponding to the different alignment options. The alignment control interface can be referred to as a "grip" or simply as a "control interface." As an example, the alignment control interface can be displayed adjacent to, above, below, or within (e.g., layered in) a block of text. In some embodiments, the alignment control interface can be positioned horizontally based on the present alignment of the block of text. For example, if the present alignment of the block of text is "left aligned," the horizontal position of the alignment control interface can correspond to the left region of the block of text. Conversely, if the present alignment of the block of text is "centered" or "right aligned," the alignment interface control can be horizontally positioned within the middle and right regions of the block of text, respectively. In some embodiments, the alignment control interface can be positioned vertically according to the top of the block of text. The alignment control interface can appear as shown in the exemplary interfaces 410, 420, and 430, of FIG. 4.

Figure 4:
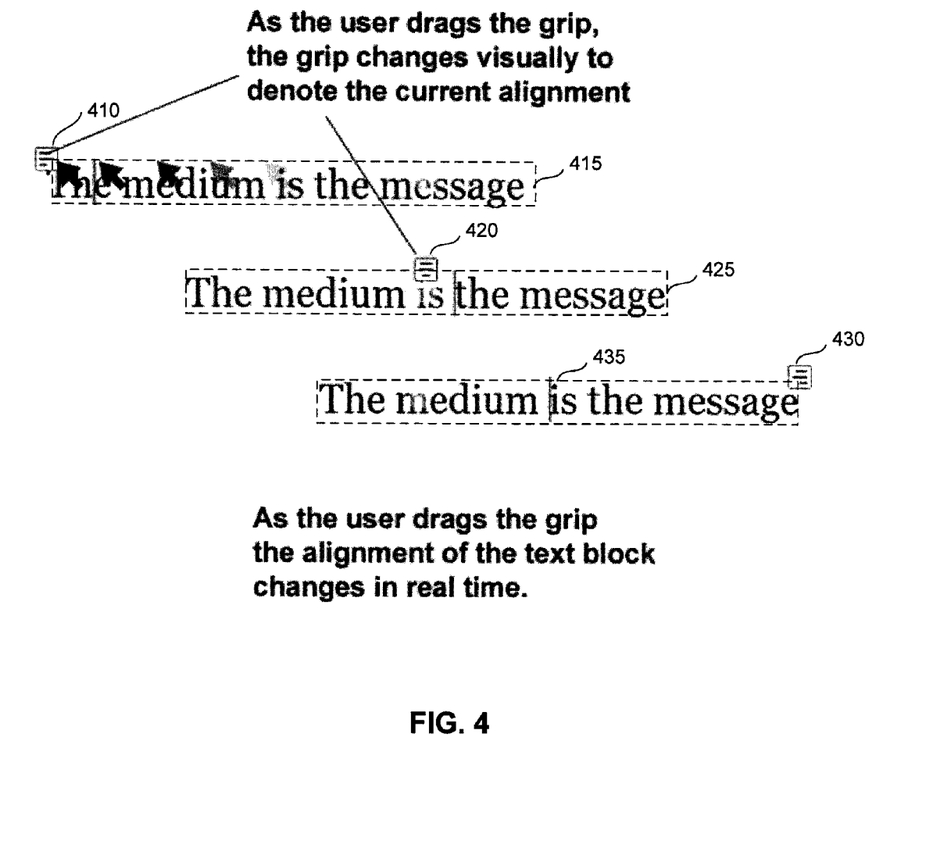
FIG. 4 illustrates example alignments of a block of text and example positions of an alignment control interface, consistent with embodiments disclosed herein.

The processor 102 detects a dragging motion associated with the alignment control interface at step 230. A dragging motion can include, for example, a click of the alignment control interface followed by a drag motion, or another action, in which the position of the alignment control interface is incrementally repositioned on the display. In some embodiments, the alignment control interface is not repositioned on the display until the user completes the click and drag motion described above, or otherwise releases control over the alignment control interface. The dragging motion can be executed, for example, through use of a mouse or other mechanical input device, as well as through touch motions (e.g., a swiping motion) on a touch-sensitive display. After detecting the dragging motion at step 230, the processor 102 at step 240 modifies the alignment of the block of text based, at least in part, on the dragging motion. In some embodiments, the processor modifies the alignment of the block of text, in real time, based on the position of the alignment control interface. For example, the alignment of the block of text can be based on the position of the alignment control interface relative to the block of text. In some embodiments, the alignment control interface is dragged horizontally across the display. As the alignment control interface is dragged from left to right or from right to left, the alignment of the block of text is set depending on the horizontal position of the alignment control interface. When the horizontal position of the alignment control interface is in the left region of the block of text, for example, the alignment of the block of text is set to "left aligned." Conversely, when the horizontal position of the alignment control interface is in the middle or right regions of the block of text, the alignment of the block of text is set to "centered" and "right aligned," respectively. This is further demonstrated by the exemplary interfaces 410, 420, and 430, and exemplary text blocks 415, 425, and 435, as illustrated in FIG. 4. In some embodiments, "leading" and "trailing" alignments can be triggered by dragging the alignment control interface into either one of the edges of the display (e.g., into the margins in a text editing application). Various partitions of the block of text into left, middle, and right regions are possible; the choice of a particular partition is not critical to any embodiment.

At step 250, the processor 102 detects an end of the dragging motion. After detecting the end of the dragging motion, the processor 102 at step 260 displays the alignment control interface in a predetermined position associated with the alignment of the block of text. If the alignment of the block of text is set to "right aligned," for example, the alignment interface control may be displayed within the right region of the display. Conversely, if the alignment of the block of text is set to "centered" or "left aligned," the alignment interface control may be displayed within the middle and left regions of the display, respectively. This is further demonstrated by the exemplary interfaces 410, 420, and 430, and exemplary text blocks 415, 425, and 435, as illustrated in FIG. 4. In some embodiments, the alignment control interface animates or "snaps into place" in the appropriate region of the display.

Figure 3:
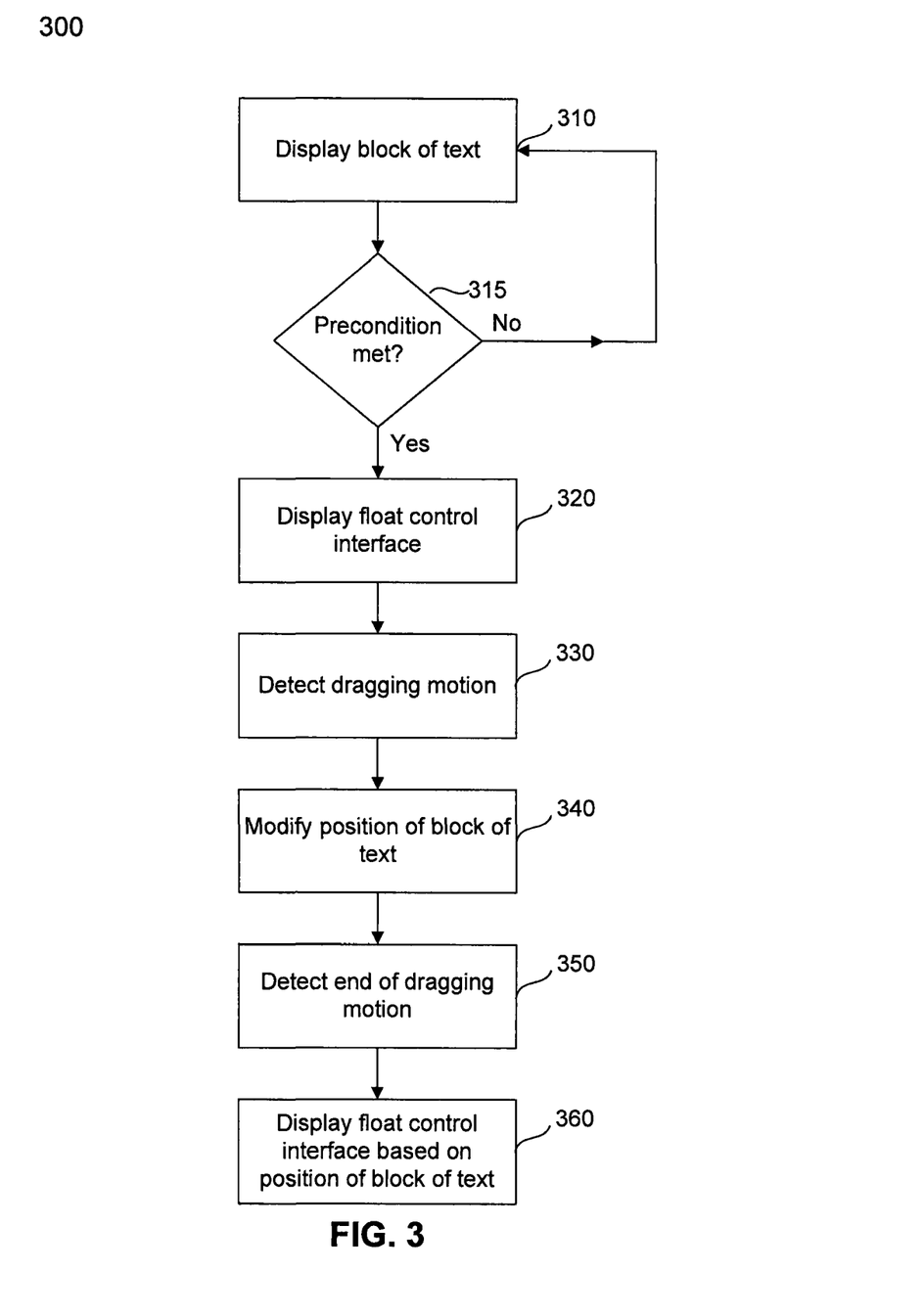
FIG. 3 is a flowchart illustrating an example method for modifying the position of a block of text based on a float control interface, consistent with embodiments disclosed herein.

FIG. 3 is an example flowchart illustrating an example method 300 in accordance with some example embodiments. Memory (such as memory 108 or RAM 110) can include a set of instructions that, when executed by a processor (such as processor 102), can be used to implement the steps of method 300. At step 310, the processor 102 displays a block of text within a text editing application. In some embodiments, the processor 102 receives an input reflecting placement of a caret in, or near, a block of text within a text editing application. At step 315, the processor 102 checks whether a precondition is met. For example, the processor 102 can check whether, during a specified time period, an input is received reflecting placement of a caret in, or near, a block of text, an input is received changing placement of the caret, a character input is received, and/or an input is detected reflecting selection of an application outside of the text editing application. In some embodiments, the processor 102 determines that the precondition is met unless any of the above-described instances occur. The specified time period can vary in duration; exemplary durations include 300 milliseconds and 500 milliseconds. Returning back to FIG. 3, if at step 315 the processor 102 determines that the precondition is not met, the method returns to step 310. Otherwise, the processor 102 continues on to step 320.

At step 320, the processor 102 displays a float control interface in proximity of the block of text. The alignment control interface can be a user-selectable visual element. For example, the float control interface can be displayed adjacent to, above, below, or within (e.g., layered in) a block of text. The processor 102 detects a dragging motion associated with the float control interface at step 330. A dragging motion can include, for example, a click and drag motion, or another action, in which the position of the float control interface is incrementally repositioned on the display. In some embodiments, the float control interface is not repositioned on the display until the user completes the click and drag motion described above, or otherwise releases control over the float control interface. The dragging motion can be executed, for example, through use of a mouse or other mechanical input device, as well as through touch motions (e.g., a swiping motion) on a touch-sensitive display. After detecting the dragging motion at step 230, the processor 102 at step 240 modifies the alignment of the block of text based, at least in part, on the dragging motion. In some embodiments, the processor modifies the alignment of the block of text, in real time, based on the position of the alignment control interface. For example, the block of text can be positioned according to the horizontal position of the float control interface. In some embodiments, the float control interface is dragged horizontally across the display. As the float control interface is dragged from left to right or from right to left, the position of the block of text is set depending on the horizontal position of the float control interface. When the horizontal position of the float control interface is in the left region of the display, for example, the block of text is also positioned in the left region of the display. Conversely, when the horizontal position of the float control interface is in the middle or right regions of the display, the block of text is positioned in the middle and right regions of the display, respectively.

At step 350, the processor 102 detects an end of the dragging motion. After detecting the end of the dragging motion, the processor 102 at step 360 displays the float control interface in a predetermined position associated with the position of the block of text. If the block of text is positioned in the left region of the display, for example, the float interface control may be displayed within the left region of the display. Conversely, if the block of text is positioned in the middle or right regions of the display, the float interface control may be displayed within the middle and right regions of the display, respectively. In some embodiments, the float control interface animates or "snaps into place" in the appropriate region of the display.

FIG. 4 illustrates example alignments of a block of text and example positions of an alignment control interface, consistent with embodiments disclosed herein. FIG. 4 includes alignment control interfaces 410, 420, and 430, and text blocks 415, 425, and 435. As shown in FIG. 4, alignment control interface 410 is displayed at the top left of text block 415, which corresponds to the left alignment of text block 415. In addition, the visual appearance of alignment control interface 410 depicts the left alignment of text block 415. As demonstrated in FIG. 4, when alignment control interface 410 is dragged from left to right (or from right to left), the alignment of the text block is also modified. Alignment control interface 420 is displayed in the middle of text block 425, which corresponds to the center alignment of text block 425 (also visually depicted in alignment control interface 420). And alignment control interface 430 is displayed at the top right of text block 435, which corresponds to the right alignment of text block 435 (also visually depicted in alignment control interface 430).

Figure 5A:
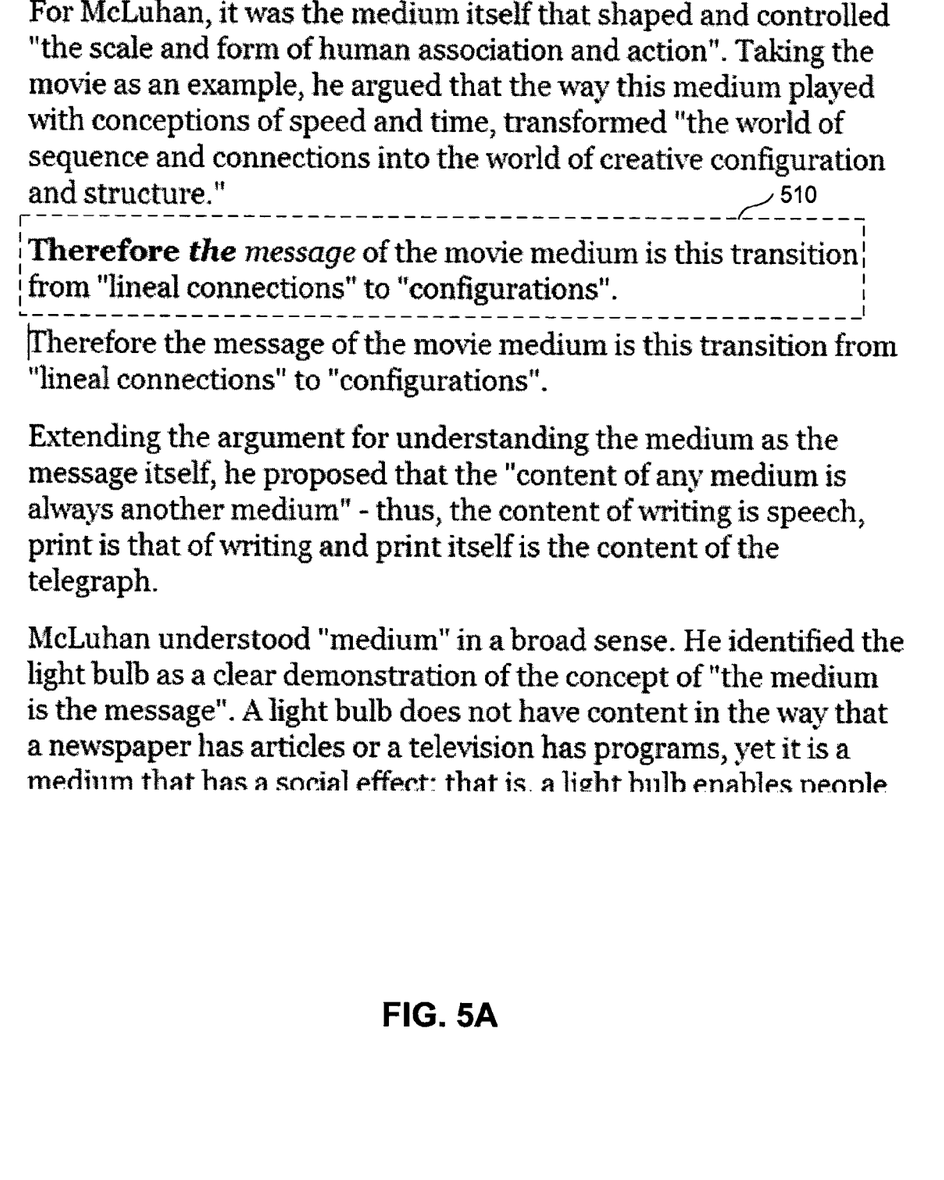
FIGS. 5A, 5B, 5C, 5D, and 5E illustrate example positions of a block of text, consistent with embodiments disclosed herein.
Figure 5B:
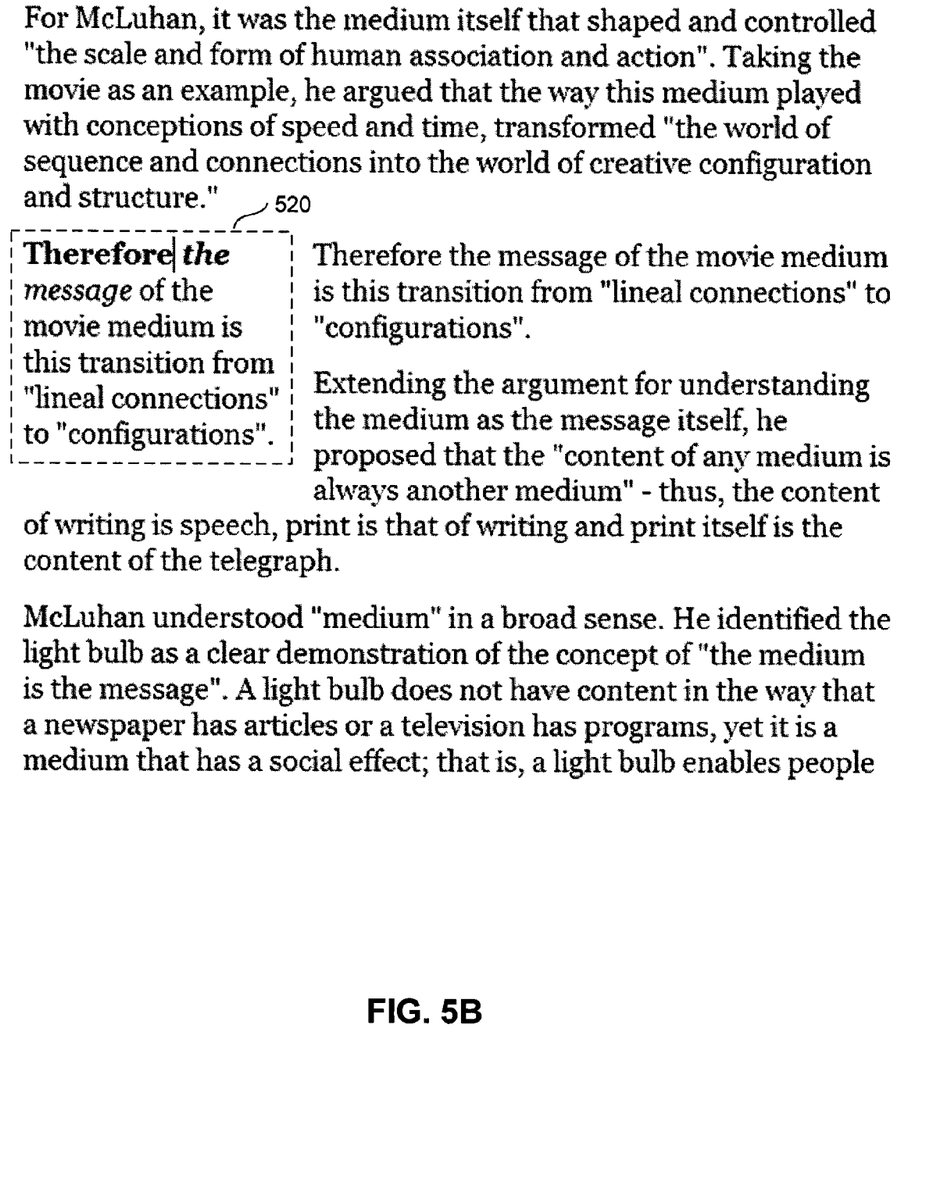
Figure 5C:
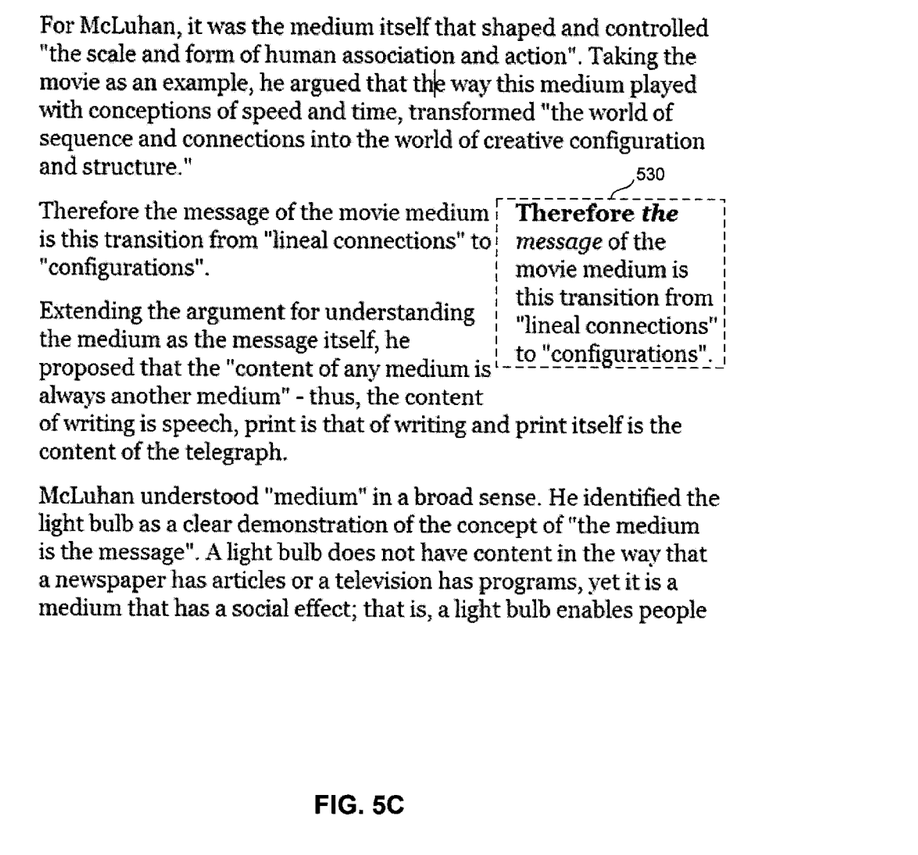

FIGS. 5A, 5B, and 5C illustrate example positions of a block of text, consistent with embodiments disclosed herein. FIGS. 5A, 5B, and 5C illustrate various positions of the text block, after the position of the text block has been modified using the methods described in connection with FIG. 3, above. As shown in FIG. 5A, for example, text block 510 is positioned as "float center." In some embodiments, this can also be referred to as a default position. In contrast, text block 520 of FIG. 5B is positioned as "float left," whereas text block 530 of FIG. 5C is positioned as "float right." As FIGS. 5B and 5C illustrate, positioning a text block as "float left" or "float right" can result in neighboring text blocks being repositioned relative to the original text block.

Figure 5D:
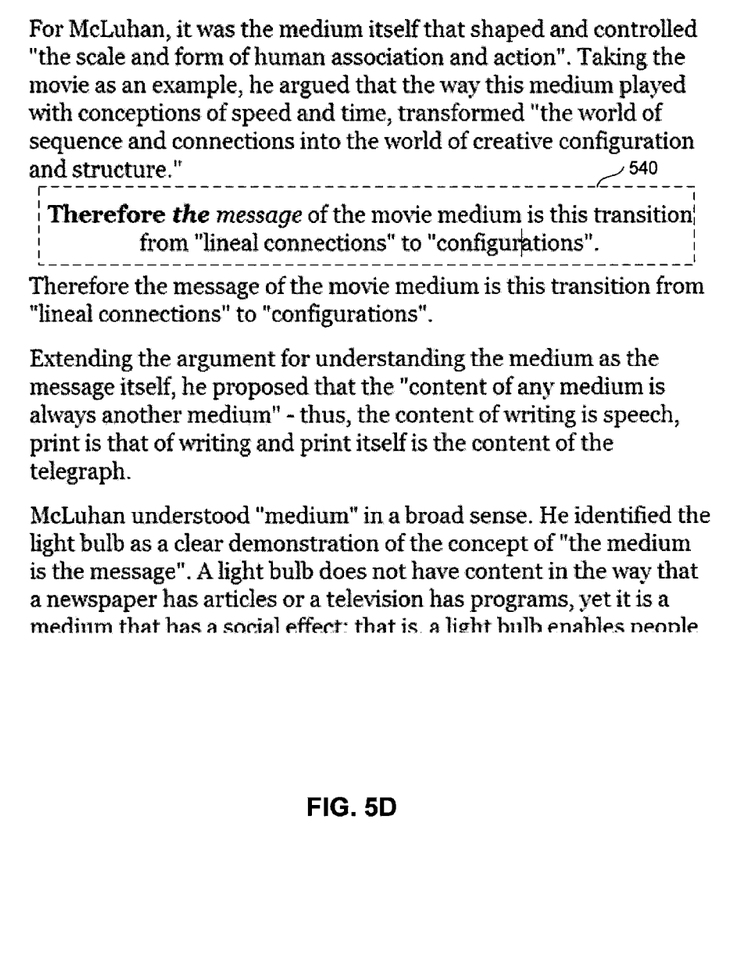
Figure 5E:
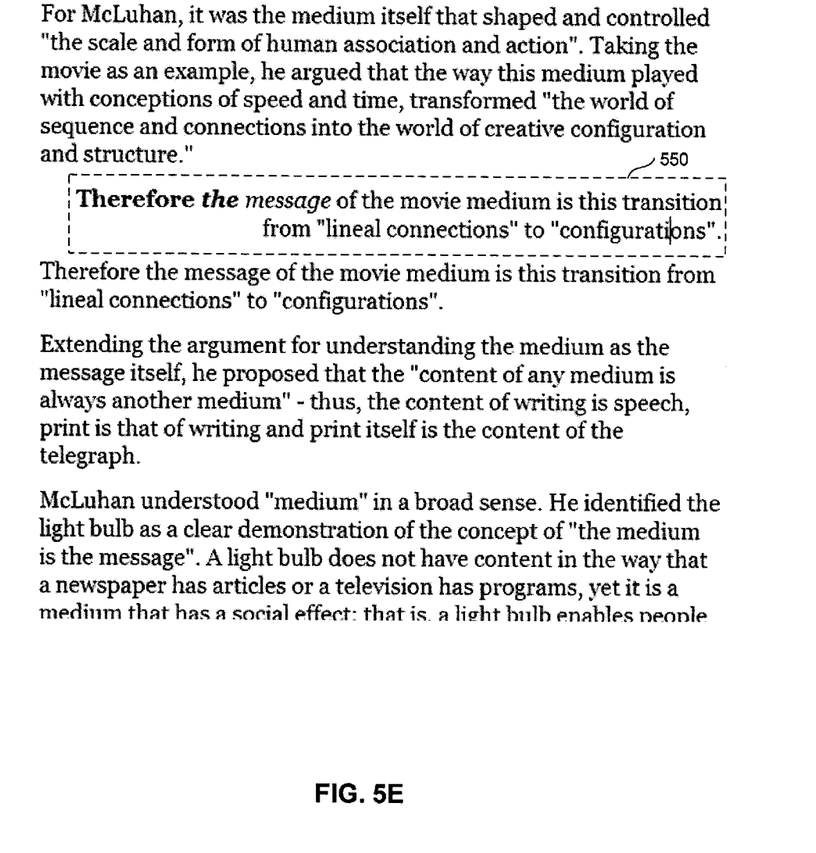

Similarly, FIGS. 5A, 5D, and 5E illustrate additional example positions of a block of text, consistent with embodiments disclosed herein. More specifically, FIGS. 5A, 5D, and 5E illustrate various positions of the text block, after the position of the text block has been modified using the methods described in connection with FIG. 2, above. Text blocks 510, 540, and 550 of FIGS. 5A, 5D, and 5E are positioned as "float center" or a default position, as described above. Furthermore, in these examples, text block 510 has been set to "left aligned," text block 540 has been set to "center aligned," and text block 550 has been set to "right aligned."

Figure 6A:
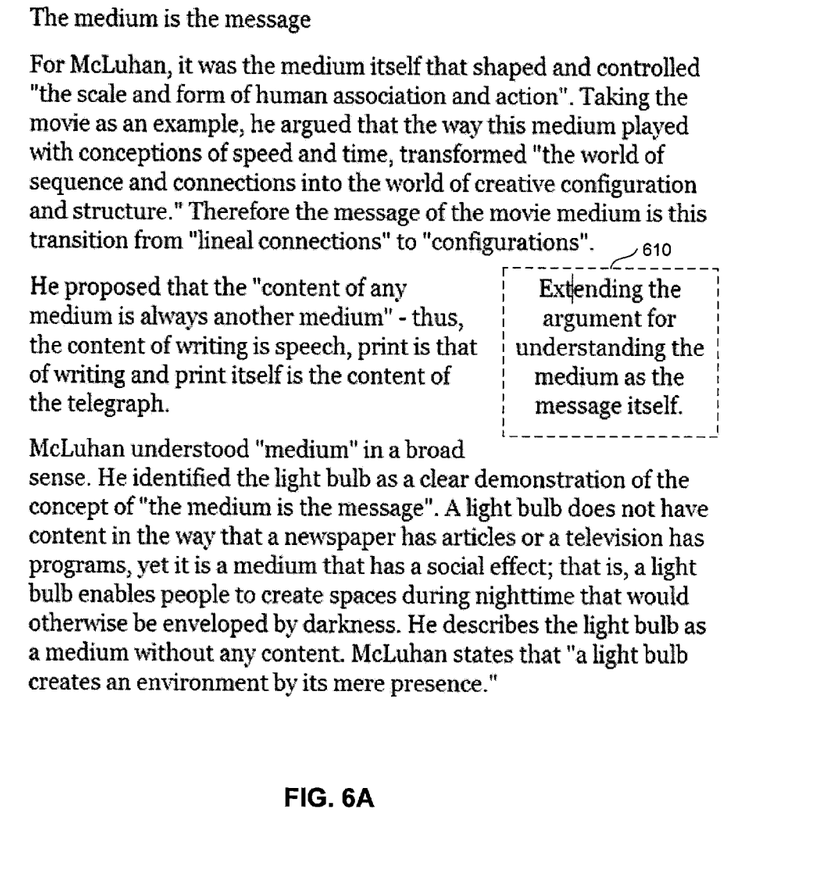
FIGS. 6A, 6B, and 6C illustrate example alignments and positions of a block of text, consistent with embodiments disclosed herein.
Figure 6B:
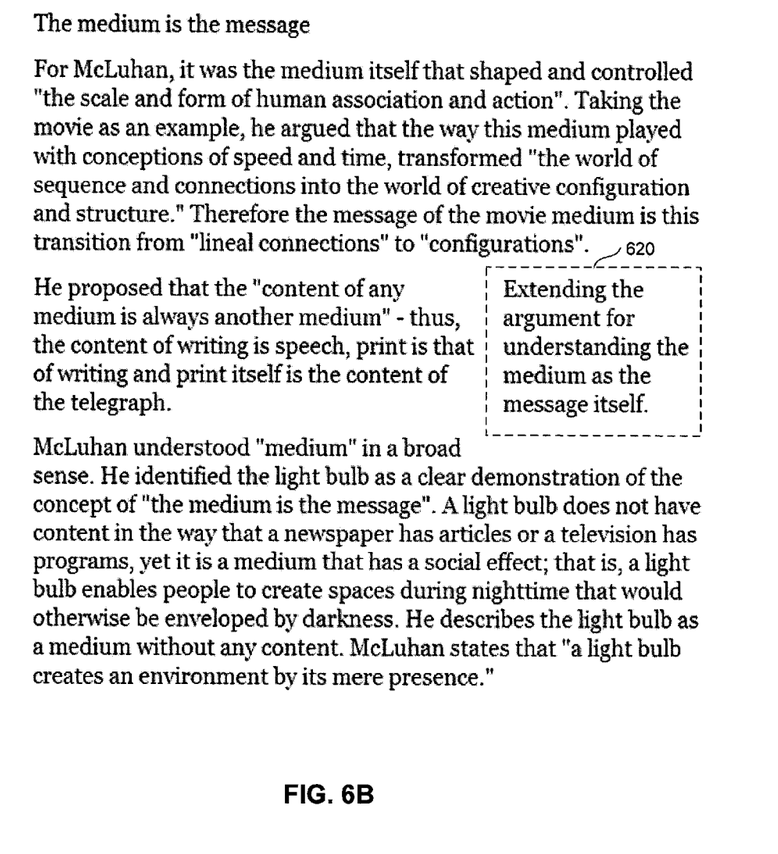
Figure 6C:
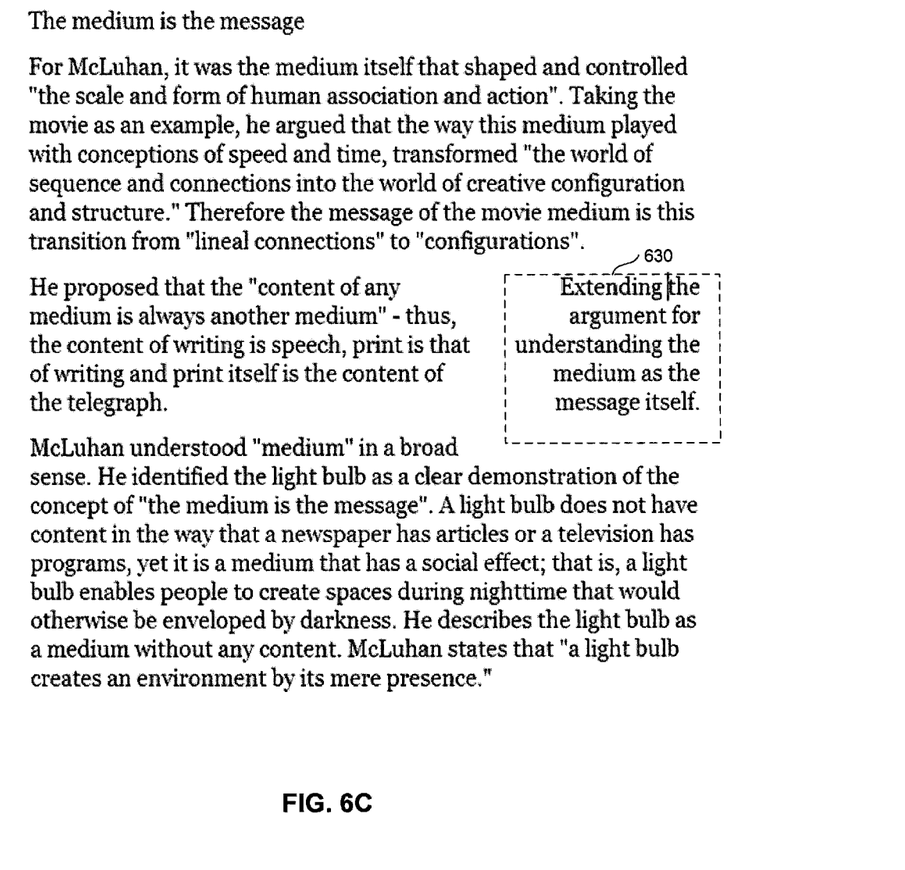

FIGS. 6A, 6B, and 6C show example alignments and positions of a block of text, consistent with embodiments disclosed herein. FIGS. 6A, 6B, and 6C illustrate various alignments of the text block, after the alignment of the text block has been modified using the methods described in connection with FIG. 2, above. In addition, text blocks 610, 620, and 630 of FIGS. 6A, 6B, and 6C are positioned as "float right" which, as described above, indicates that the neighboring text blocks have been repositioned relative to text blocks 610, 620, and 630. Furthermore, in these examples, text block 610 has been set to "center aligned," text block 620 has been set to "left aligned," and text block 630 has been set to "right aligned."

FIGS. 6A, 6B, and 6C demonstrate the joint use of alignment control and float control on a given block of text.

Other embodiments of the invention will be apparent to those skilled in the art from consideration of the specification and practice of the invention disclosed herein. It is intended that the specification and examples be considered as examples only, with a true scope and spirit of the invention being indicated by the following claims.

What is claimed is:

1. A method for an electronic device having an input device and a display, the method comprising:
    displaying a block of text within a text editing application;
    displaying, in proximity of the block of text and within a text presentation portion of the text editing application, an alignment control interface after a precondition is met;
    detecting a dragging motion associated with the alignment control interface, the dragging motion changing a position of the alignment control interface relative to the block of text;
    modifying an alignment of the block of text based, at least in part, on the detected dragging motion, wherein modifying the alignment of the block of text based on the detected dragging motion comprises modifying the alignment of the block of text based on the position of the alignment control interface relative to the block of text;
    detecting an end of the dragging motion that results in a modified alignment of the block of text; and
    updating the alignment control interface based on the modified alignment of the block of text.

2. The method of claim 1, wherein the precondition is met, unless, during a predetermined time period, one of the following occurs:
    receiving an input reflecting placement of a caret in a block of text;
    receiving an input reflecting repositioning of the caret;
    receiving a character input; or
    detecting an input reflecting selection of an application outside of the text editing application.

3. The method of claim 2, wherein the predetermined time period is 300 milliseconds.

4. The method of claim 1, wherein modifying the alignment of the block of text based on the position of the alignment control interface relative to the block of text comprises:
    modifying the alignment of the block of text to be left aligned when the alignment control interface is in a left region of the block of text;
    modifying the alignment of the block of text to be right aligned when the alignment control interface is in a right region of the block of text, or
    modifying the alignment of the block of text to be centered when the alignment control interface is in a middle region of the block of text.

5. The method of claim 1, wherein updating the alignment control interface based on the modified alignment of the block of text comprises:
    displaying the alignment control interface in a left region of the block of text when the modified alignment of the block of text is set to left aligned;
    displaying the alignment control interface in a right region of the block of text when the modified alignment of the block of text is set to right aligned; or
    displaying the alignment control interface in a middle region of the block of text when the modified alignment of the block of text is set to centered.

6. A method for an electronic device having an input device and a display, the method comprising:
- displaying a block of text within a text editing application;
- displaying, in proximity of the block of text and within a text presentation portion of the text editing application, a float control interface after a precondition is met;
- detecting a dragging motion associated with the float control interface, the dragging motion changing a position of the float control interface relative to the display;
- modifying a position of the block of text based, at least in part, on the detected dragging motion, wherein modifying the position of the block of text based on the detected dragging motion comprises modifying the position of the block of text based on the position of the floating control interface relative to the display;
- detecting an end of the dragging motion that results in a modified position of the block of text; and
- updating the float control interface based on the modified position of the block of text.

7. The method of claim 6, wherein the precondition is met, unless, during a predetermined time period, one of the following occurs:
- receiving an input reflecting placement of a caret in a block of text;
- receiving an input reflecting repositioning of the caret;
- receiving a character input; or
- detecting an input reflecting selection of an application outside of the text editing application.

8. The method of claim 7, wherein the predetermined time period is 300 milliseconds.

9. The method of claim 6, wherein modifying the position of the block of text based on the position of the float control interface relative to the display comprises:
- modifying the position of the block of text to be left aligned when the float control interface is in a left region of the display;
- modifying the position of the block of text to be right aligned when the float control interface is in a right region of the display, or
- modifying the position of the block of text to be centered when the float control interface is in a middle region of the display.

10. The method of claim 6, wherein updating the float control interface based on the modified position of the block of text comprises:
- displaying the float control interface in a left region of the block of text when the modified position of the block of text is in a left region of the display;
- displaying the float control interface in a right region of the block of text when the modified position of the block of text is in a right region of the display; or
- displaying the float control interface in a middle region of the block of text when the modified position of the block of text is in a middle region of the display.

11. An electronic device comprising:
- a display, configured to display characters;
- an input device;
- a memory storing one or more instructions; and
- a processor configured to execute the one or more instructions to perform operations comprising:
  - displaying a block of text within a text editing application;
  - displaying, in proximity of the block of text and within a text presentation portion of the text editing application, an alignment control interface after a precondition is met;
  - detecting a dragging motion associated with the alignment control interface, the dragging motion changing a position of the alignment control interface relative to the block of text;
  - modifying an alignment of the block of text based, at least in part, on the detected dragging motion, wherein modifying the alignment of the block of text based on the detected dragging motion comprises modifying the alignment of the block of text based on the position of the alignment control interface relative to the block of text;
  - detecting an end of the dragging motion that results in a modified alignment of the block of text; and
  - updating the alignment control interface based on the modified alignment of the block of text.

12. The electronic device of claim 11, wherein the precondition is met, unless, during a predetermined time period, one of the following occurs:
- receiving an input reflecting placement of a caret in a block of text;
- receiving an input reflecting repositioning of the caret;
- receiving a character input; or
- detecting an input reflecting selection of an application outside of the text editing application.

13. The electronic device of claim 12, wherein the predetermined time period is 300 milliseconds.

14. The electronic device of claim 11, wherein modifying the alignment of the block of text based on the position of the alignment control interface relative to the block of text comprises:
- modifying the alignment of the block of text to be left aligned when the alignment control interface is in a left region of the block of text;
- modifying the alignment of the block of text to be right aligned when the alignment control interface is in a right region of the block of text, or
- modifying the alignment of the block of text to be centered when the alignment control interface is in a middle region of the block of text.

15. The electronic device of claim 11, wherein updating the alignment control interface based on the modified alignment of the block of text comprises:
- displaying the alignment control interface in a left region of the block of text when the modified alignment of the block of text is set to left aligned;
- displaying the alignment control interface in a right region of the block of text when the modified alignment of the block of text is set to right aligned; or
- displaying the alignment control interface in a middle region of the block of text when the modified alignment of the block of text is set to centered.

16. An electronic device comprising:
- a display, configured to display characters;
- an input device;
- a memory storing one or more instructions; and
- a processor configured to execute the one or more instructions to perform operations comprising:
  - displaying a block of text within a text editing application;
  - displaying, in proximity of the block of text and within a text presentation portion of the text editing application, a float control interface after a precondition is met;
  - detecting a dragging motion associated with the float control interface, the dragging motion changing a position of the float control interface relative to the display;

modifying a position of the block of text based, at least in part, on the detected dragging motion, wherein modifying the position of the block of text based on the detected dragging motion comprises modifying the position of the block of text based on the position of the float control interface relative to the block of text;

detecting an end of the dragging motion that results in a modified position of the block of text; and updating the float control interface based on the modified position of the block of text.

17. The electronic device of claim 16, wherein the precondition is met, unless, during a predetermined time period, one of the following occurs:

receiving an input reflecting placement of a caret in a block of text;

receiving an input reflecting repositioning of the caret;

receiving a character input; or detecting an input reflecting selection of an application outside of the text editing application.

18. The electronic device of claim 17, wherein the predetermined time period is 300 milliseconds.

19. The electronic device of claim 16, wherein modifying the position of the block of text based on the position of the float control interface relative to the display comprises:

modifying the position of the block of text to be left aligned when the float control interface is in a left region of the display;

modifying the position of the block of text to be right aligned when the float control interface is in a right region of the display, or modifying the position of the block of text to be centered when the float control interface is in a middle region of the display.

20. The electronic device of claim 16, wherein updating the float control interface based on the modified position of the block of text comprises:

displaying the float control interface in a left region of the block of text when the modified position of the block of text is in a left region of the display;

displaying the float control interface in a right region of the block of text when the modified position of the block of text is in a right region of the display; or displaying the float control interface in a middle region of the block of text when the modified position of the block of text is in a middle region of the display.

* * * * *